(12) United States Patent
Oh et al.

(10) Patent No.: US 11,990,638 B2
(45) Date of Patent: May 21, 2024

(54) BATTERY MODULE AND BATTERY PACK INCLUDING THE SAME

(71) Applicant: LG ENERGY SOLUTION, LTD., Seoul (KR)

(72) Inventors: Jong Ryeol Oh, Daejeon (KR); Jongyoung Lee, Daejeon (KR); Beak San Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 647 days.

(21) Appl. No.: 17/265,465

(22) PCT Filed: Jun. 22, 2020

(86) PCT No.: PCT/KR2020/008059
§ 371 (c)(1),
(2) Date: Feb. 2, 2021

(87) PCT Pub. No.: WO2021/125469
PCT Pub. Date: Jun. 24, 2021

(65) Prior Publication Data
US 2022/0115736 A1    Apr. 14, 2022

(30) Foreign Application Priority Data
Dec. 17, 2019    (KR) .................. 10-2019-0169202

(51) Int. Cl.
*H01M 50/367*    (2021.01)
*H01M 50/505*    (2021.01)

(52) U.S. Cl.
CPC ....... *H01M 50/367* (2021.01); *H01M 50/505* (2021.01); *H01M 2220/20* (2013.01)

(58) Field of Classification Search
CPC ................... H01M 50/367; H01M 50/505
See application file for complete search history.

(56) References Cited

U.S. PATENT DOCUMENTS

| 8,420,242 B2 | 4/2013 | Sato |
| 10,658,649 B2 | 5/2020 | Park et al. |
| (Continued) | | |

FOREIGN PATENT DOCUMENTS

| EP | 3 671 895 A1 | 6/2020 |
| JP | 2009-164085 A | 7/2009 |
| (Continued) | | |

OTHER PUBLICATIONS

International Search Report for PCT/KR2020/008059 (PCT/ISA/210) dated Sep. 28, 2020.
(Continued)

*Primary Examiner* — Karie O'Neill Apicella
(74) *Attorney, Agent, or Firm* — Birch, Stewart, Kolasch & Birch, LLP (57) ABSTRACT

A battery modules includes a battery cell stack, in which a plurality of battery cells are stacked, a frame accommodating the battery cell stack, end plates covering front and rear surfaces of the battery cell stack, and busbar frames formed between the end plates and the battery cell stack, and a plurality of slots are formed in each of the busbar frames and a venting portion is formed at the center of each of the end plates, and the plurality of battery cells pass through the plurality of slots and are connected to the outside through a first passage part connected to the venting portion.

13 Claims, 11 Drawing Sheets

(56) References Cited

U.S. PATENT DOCUMENTS

| | | |
|---|---|---|
| 2012/0164490 A1 | 6/2012 | Itoi et al. |
| 2016/0072166 A1 | 3/2016 | Park et al. |
| 2019/0229364 A1 | 7/2019 | Sakamoto et al. |
| 2019/0334137 A1 | 10/2019 | Seo et al. |
| 2020/0076025 A1* | 3/2020 | Jo .................... H01M 10/6556 |
| 2021/0226295 A1 | 7/2021 | Kwon et al. |

FOREIGN PATENT DOCUMENTS

| | | |
|---|---|---|
| JP | 2011-171114 A | 9/2011 |
| JP | 2013-229266 A | 11/2013 |
| JP | 2019-128980 A | 8/2019 |
| KR | 10-2009-0000292 A | 1/2009 |
| KR | 10-2009-0010393 A | 1/2009 |
| KR | 10-2014-0077811 A | 6/2014 |
| KR | 10-2014-0144473 A | 12/2014 |
| KR | 10-2016-0008948 A | 1/2016 |
| KR | 10-2016-0059629 A | 5/2016 |
| KR | 10-2017-0074543 A | 6/2017 |
| KR | 10-2017-0135469 A | 12/2017 |
| KR | 10-2018-0107569 A | 10/2018 |
| KR | 10-2019-0064887 A | 6/2019 |
| KR | 10-2019-0107900 A | 9/2019 |
| WO | WO 2019/203460 A1 | 10/2019 |

OTHER PUBLICATIONS

Extended European Search Report for European Application No. 20851192.3, dated Oct. 1, 2021.

\* cited by examiner

[FIG. 1]

Prior Art

【FIG. 2】

Prior Art

BATTERY MODULE AND BATTERY PACK INCLUDING THE SAME

TECHNICAL FIELD

Cross Citation with Related Application(s)

This application claims the benefit of Korean Patent Application No. 10-2019-0169202 filed on Dec. 17, 2019 with the Korean Intellectual Property Office, the disclosure of which is incorporated herein by reference in its entirety.

The present disclosure relates to a battery module and a battery pack including the same, and more particularly to a battery module including a venting structure, and a battery pack including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell, and to configure a battery pack by using at least one of the battery modules and adding other components.

Such a battery module includes a battery cell stack in which a plurality of battery cells are stacked, busbar frames each formed at both ends of the battery cell stack, a terminal busbar formed on the busbar frame, and an end plate formed outside the busbar frame.

Figure 1:
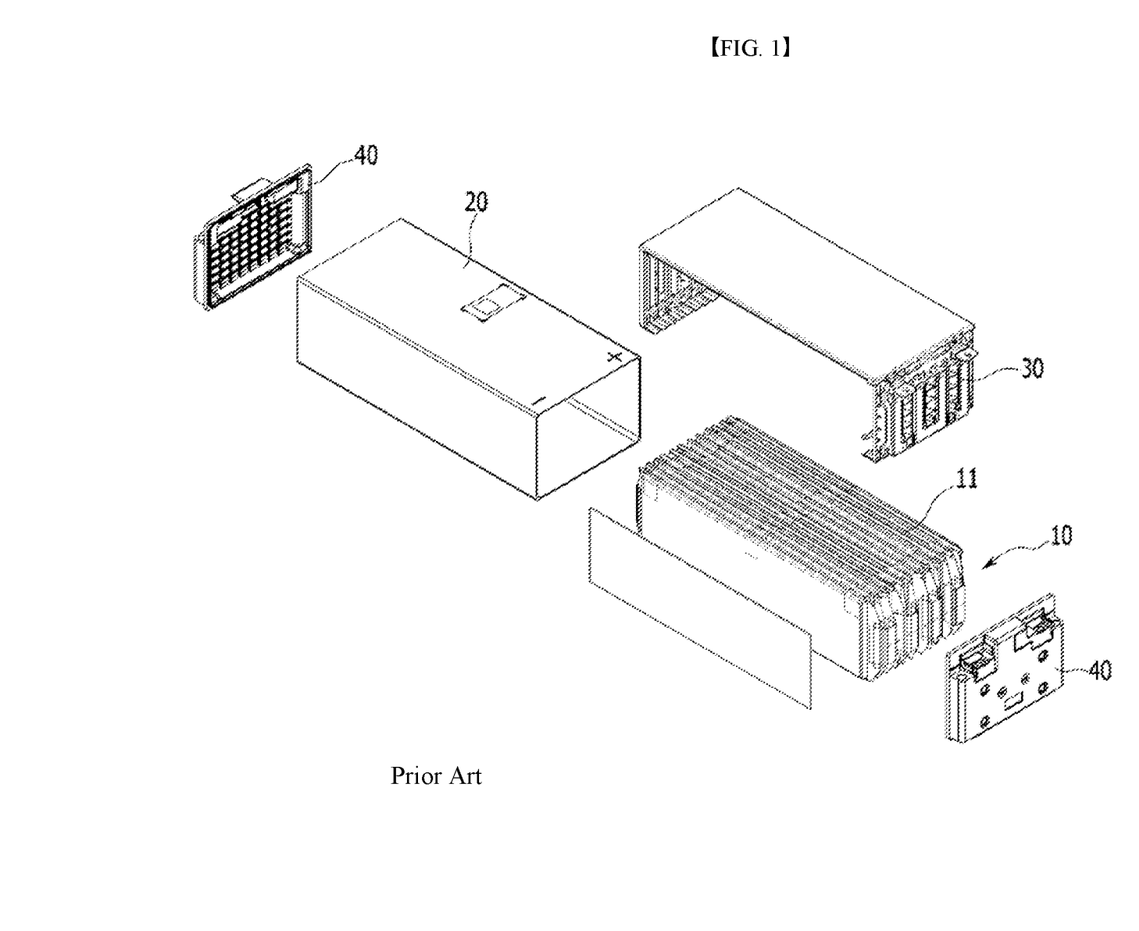
FIG. 1 is a perspective view illustrating a battery module according to the prior art.
Figure 2:
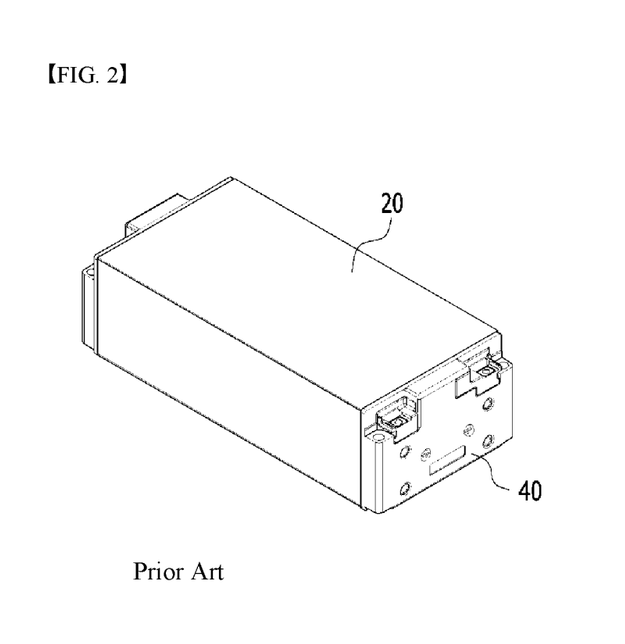
FIG. 2 is a view illustrating a state, in which the battery module of FIG. 1 is assembled.

FIG. 1 is a perspective view illustrating a battery module according to the prior art. FIG. 2 is a view illustrating a state, in which the battery module of FIG. 1 is assembled.

Referring to FIGS. 1 and 2, a battery module according to the prior art includes a battery cell stack 10, in which a plurality of battery cells 11 are stacked, a frame 20 accommodating the battery cell stack 10, busbar frames 30 formed on front and rear surfaces of the battery cell stack 10, and end plates 40 covering the busbar frames 30.

Here, as illustrated in FIG. 2, the frame 20 and the end plates 40 are coupled to each other, and the frame 20 and the end plates 40 are coupled to each other so as to be sealed. In this way, if the frame 20 accommodating the battery cell stack 10 and the end plates 40 are coupled to each other to be sealed, when the internal pressures of the battery cells 11 increase to exceed the fusion strength limit value of the battery cells 11 during overcharge of the battery cells 110, the gas generated by battery cells 11 is discharged to the outside of the battery cells 11, and the battery module and the battery pack, on which the battery module is mounted, may be exploded due to the battery module structure sealed without a discharge hole. When the internal pressures of the battery cells 11 increase to exceed the limit value of the fusion strength of the sealing part during overcharge of the battery cells 110, the gas generated by the battery cells 11 is discharged to the outside of the battery cells 11, and the battery module and the battery pack, on which the battery module is mounted, may be exploded due to the battery module structure sealed without a discharge hole.

DETAILED DESCRIPTION OF THE INVENTION

Technical Problem

It is an object of the present disclosure to provide a battery module having a venting structure that can discharge gas in the interior of the battery module, and a battery pack including the same.

Technical problems to be solved by the present disclosure are not limited to the above-mentioned technical problems, and other technical problems, which are not mentioned above, may be clearly understood from the following descriptions by those skilled in the art to which the present disclosure pertains.

Technical Solution

In order to achieve the above object, according to an aspect of the present disclosure, there are provided a battery module and a battery pack including the same, the battery module including: a battery cell stack, in which a plurality of battery cells are stacked, a frame accommodating the battery cell stack, end plates covering a front surface and a rear surface of the battery cell stack, and busbar frames formed between the end plates and the battery cell stack, and a plurality of slots are formed in each of the busbar frames and a venting portion is formed at the center of each of the end plates, and the plurality of battery cells pass through the plurality of slots and are connected to the outside through a first passage connected to the venting portion.

The end plate may be coupled to the frame through welding, and the end plate and the frame may be sealed.

An end of each of the plurality of battery cells may be sealed to form a sealing part.

Each of the plurality of battery cells may include an electrode lead protruding from each end of the battery cell, and the electrode leads may pass through the slots and be joined to busbars formed in the busbar frames.

A connector opening may be formed at an upper end of the end plate, a connector may be inserted into and installed in the connector opening, and the plurality of battery cells may pass through the plurality of slots to be connected to the outside through a second passage connected to the connector opening.

Each busbar frame may include a terminal bus bar formed on one side thereof and protruding toward a respective one of the end plates, the terminal busbar may be formed to pass through a terminal busbar opening formed at one end of the end plate, and the plurality of battery cells may pass through the plurality of slots to be connected to the outside through a third passage connected to the terminal busbar opening.

The venting portion may be at least one venting hole.

The at least one venting hole may be a plurality of venting holes

The venting portion may have at least one venting slot.

The at least one venting slot may be a plurality of venting slots formed at portions corresponding to the plurality of slots formed in the busbar frame.

Advantageous Effects

According to an embodiment of the present disclosure, the battery module and the battery pack including the same are configured such that the gas in the interior of the battery module can be discharged to the outside through the venting portions formed in the end plates, thereby delaying ignition due to an explosion when the battery module is exploded.

The effects of the present disclosure are not limited to the above-mentioned effects, and other effects not mentioned will be clearly understood by those skilled in the art from the description of the claims.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Hereinafter, a battery module according to an embodiment of the present disclosure will be described with reference to FIGS. 3 to 5.

Figure 3:
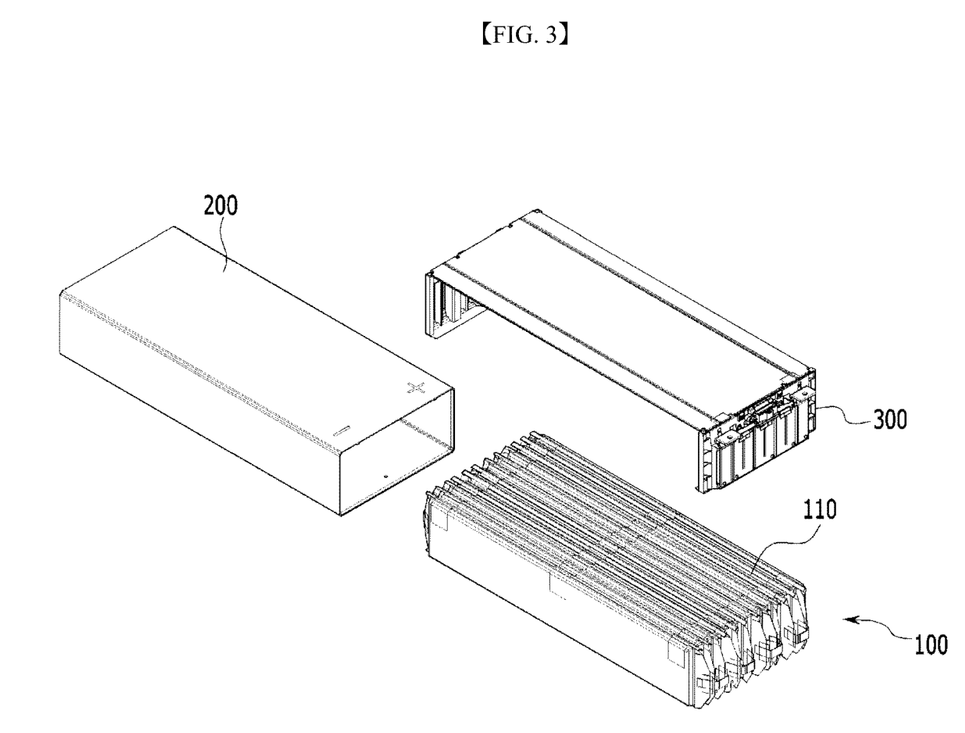
FIG. 3 is an exploded perspective view illustrating a battery module according to an embodiment of the present disclosure.

FIG. 3 is an exploded perspective view illustrating a battery module according to an embodiment of the present disclosure. FIG. 4 is a view illustrating a state, in which a first passage part of the battery module according to the embodiment of the present disclosure is formed. FIG. 5 is a view illustrating part 5-5 of FIG. 4.

Figure 4:
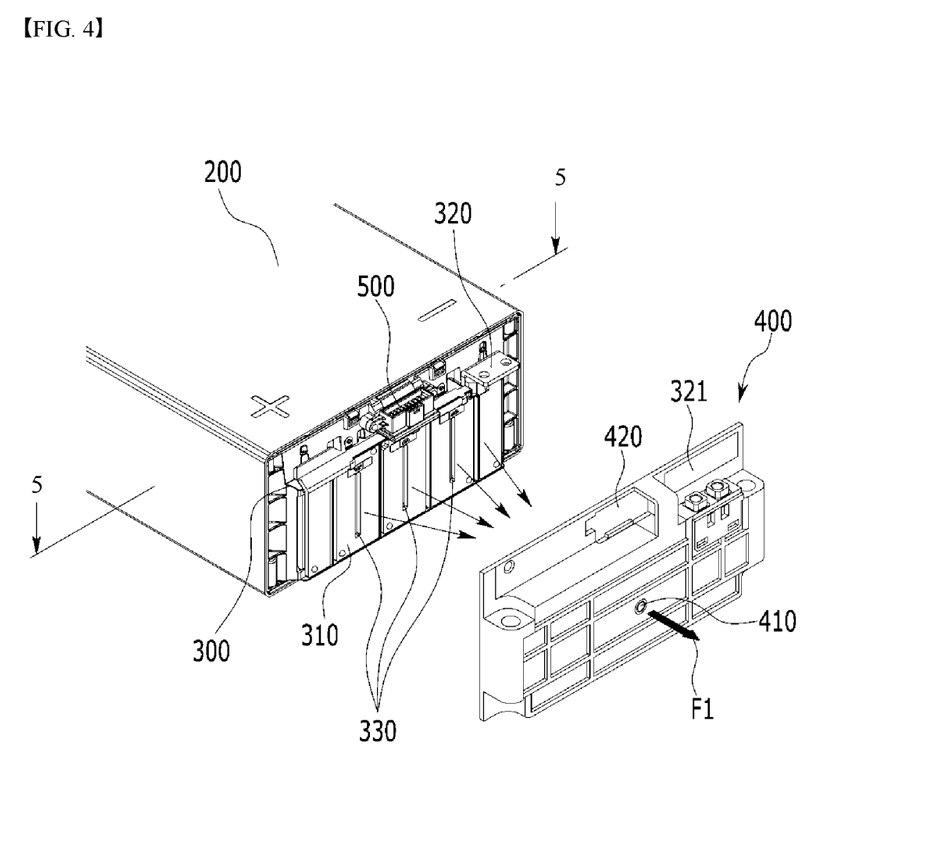
FIG. 4 is a view illustrating a state, in which a first passage part of the battery module is formed, according to the embodiment of the present disclosure.
Figure 5:
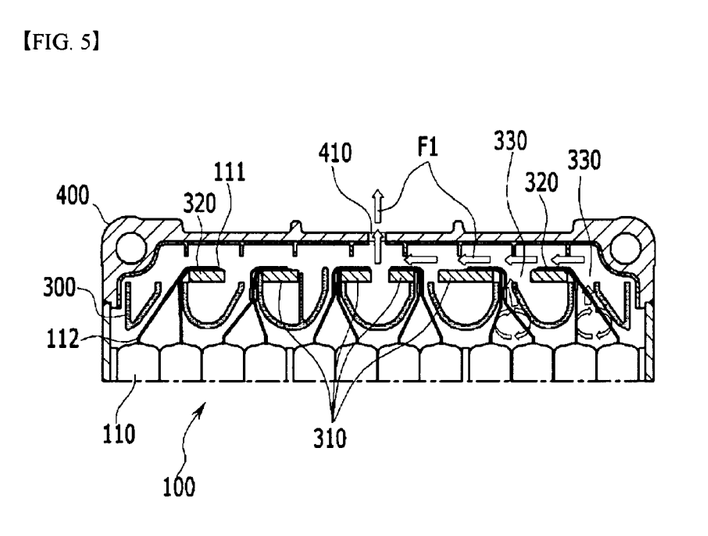
FIG. 5 is a view illustrating portion 5-5 of FIG. 4.

Referring to FIGS. 3 to 5, the battery module according to an embodiment of the present disclosure includes a battery cell stack, in which a plurality of battery cells 110 are stacked, a frame 200 accommodating the battery cell stack 100, end plates 400 covering front and rear surfaces of the battery cell stack 100, and busbar frames 300 formed between the end plates 400 and the battery cell stack 100, and a plurality of slots 330 are formed in each of the busbar frames 300 and a venting portion 410 is formed at the center of each of the end plates 400, and the plurality of battery cells 110 pass through the plurality of slots 330 and are connected to the outside through a first passage part F1 connected to the venting portion 410.

The battery cell 110 may be a secondary battery, and may be a pouch type secondary battery. The battery cells 110 may be formed of a plurality of battery cells and the plurality of the battery cells 110 may be stacked to be electrically connected to each other to form the battery cell stack 100. Each of the plurality of the battery cells 110 may include an electrode assembly, a battery case, and electrode leads 111 protruding from the electrode assembly to opposite sides thereof.

The electrode assembly may include a positive electrode plate, a negative electrode plate, a separator, and the like. A cell case is adapted to package the electrode assembly, and may be formed of a laminate sheet including a resin layer and a metal layer. The cell case may include a case body and sealing parts 112.

The sealing parts 112 are formed to extend from the case body and ends of the sealing parts are formed to be sealed. The sealing parts 112 may be formed so as to surround the electrode leads 111 formed to extend from the case body.

The frame 200 may be formed to accommodate the battery cell stack 100 and the busbar frame 300 coupled thereto on the upper, lower, left, and right surfaces of the battery cell stack 100. A thermally conductive resin may be injected between a lower end of the battery cell stack 100 and a lower surface of the frame 200, and a thermally conductive resin layer may be formed between the lower surface of the battery cell stack 100 and the lower surface of the frame 200, through the injected thermally conductive resin.

The busbar frames 300 are formed on front and rear surfaces of the battery cell stack 100, respectively. The busbar frames 300 may be formed to cover the front and rear surfaces of the battery cell stack 100 so as to electrically connect the electrode leads 111 of the plurality of the battery cells 110. Busbars 310 are disposed on outer surfaces of the busbar frames 300, and the busbar 310 are connected to the electrode leads 111 to be electrically connected to the electrode leads 111.

The terminal busbars 320 are formed on the outer sides of the busbar frames 300 with respect to the battery cell stack 100. The terminal busbars 320 are formed on opposite sides of the busbar frames 300 to electrically connect the busbar frames 300 connected to the plurality of battery cells 110 and a power source formed in a battery pack.

The plurality of slots 330 may be formed on each of the busbar frames 300 and the busbars 310. The electrode leads 111 protruding from the both ends of the plurality of battery cells 110 may pass through the plurality of slots 330 to be joined to the busbars 310 formed on the outer surfaces of busbar frames 300. Then, the electrode leads 111 and the busbars 310 may be joined to each other through welding.

The end plates 400 may be formed on the outer sides of the terminal busbars 320 with respect to the lengthwise direction of the battery cell stack. The end plates 400 protect the busbar frames 300 and various electronic components connected thereto from an external impact, have a battery module mounting structure for mounting the battery module on the battery pack, and the terminal busbars 320 may protrude to the outside through terminal busbar openings 321 formed in the end plates 400, which will be described below, to guide electrical connections between the busbar frames 300 and a power source formed in the battery pack. The end plates 400 are coupled to the frames 200 through welding, and through this, the plurality of battery cells 110 inside the end plates 400 and the frames 200 may be located inside the sealed cover.

The venting portion 410 may discharge gas passing through the slots 330 of the busbar frame 300 to the outside. According to the embodiment, the venting portion 410 may be formed of a venting hole 410. The venting hole 410 may be located at the center of each of the end plates 400, and may discharge the gas discharged from the plurality of slots 330.

A connector 500 may protrude from the busbar frame 300 at an upper end of the outer surface of the busbar frame 300, and may be coupled to the busbar frame 300 to be electrically connected to the plurality of battery cells 110 and the electronic components formed in the battery pack outside the battery module. A connector opening 420, which will be described below, may be formed in the end plate 400 such that the connector 500 may protrude to the outside through the connector opening 420. As an example, the connector 500 may transfer a voltage sensed from the plurality of battery cells to a battery management system (BMS).

Hereinafter, the first passage part according to the embodiment of the present disclosure will be described with reference to FIGS. 4 and 5.

FIG. 4 is a view illustrating a state, in which a first passage part of the battery module is formed, according to the embodiment of the present disclosure. FIG. 5 is a view illustrating portion 5-5 of FIG. 4.

According to the embodiment of the present disclosure, the plurality of battery cells 110 passes through the plurality of slots 330 and are connected to the outside through the first passage part F1 connected to the venting portion 410.

If the internal pressures of the battery cells increase and exceed a fusion strength limit value of the sealing parts 112 when the plurality of battery cells 110 are overcharged, the gas in the interior of battery cells 110 may be discharged to the outside. In the battery module, the end plates 400 and the frames 200 are coupled to each other to be sealed for airtightness, and according to the prior art, when the gas is discharged from the battery cells, there is a danger of explosion if the discharged gas fails to be discharged to the outside of the battery module and is accumulated in the interior of the battery module. Accordingly, according to the embodiment of the present disclosure, the gas generated by the plurality of battery cells 110 is made to pass through the plurality of slots 330 and be discharged to the outside through the venting portion 410 by disposing the venting portion 410 at the center of the end plate 400, whereby ignition may be delayed when the battery module is exploded and damage to the peripheral electronic components, which is caused by the explosion, may be minimized.

A route that passes through the plurality of slots 330 from the plurality of battery cells 110 to be connected to the venting portion 410 is defined as the first passage part F1, and the gas generated by the plurality of battery cells 110 may be discharged to the outside through the first passage part F1.

In more detail, according to the embodiment of the present disclosure, in the plurality of battery cells 110, the sealing parts 112, ends of which are sealed, may be formed, the sealing parts 112 may pass through the plurality of slots 330 and are connected to the outside through the first passage part F1 connected to the venting portion 410. The gas generated while the sealing states of the sealing parts 112 is released due to an increase in the pressures of the battery cells 110 and may be discharged to the outside through the first passage part F1.

Hereinafter, a second passage part according to the embodiment of the present disclosure will be described with reference to FIGS. 6 and 7.

Figure 6:
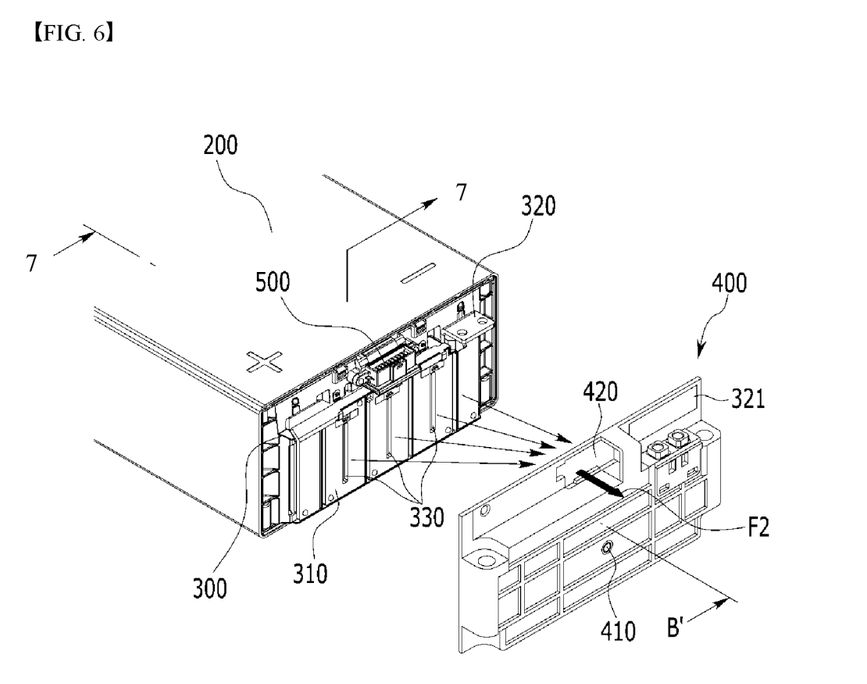
FIG. 6 is a view illustrating a state, in which a second passage part of the battery module is formed, according to the embodiment of the present disclosure.

FIG. 6 is a view illustrating a state, in which a second passage part of the battery module is formed, according to the embodiment of the present disclosure. FIG. 7 is a view illustrating portion 7-7 of FIG. 6.

Figure 7:
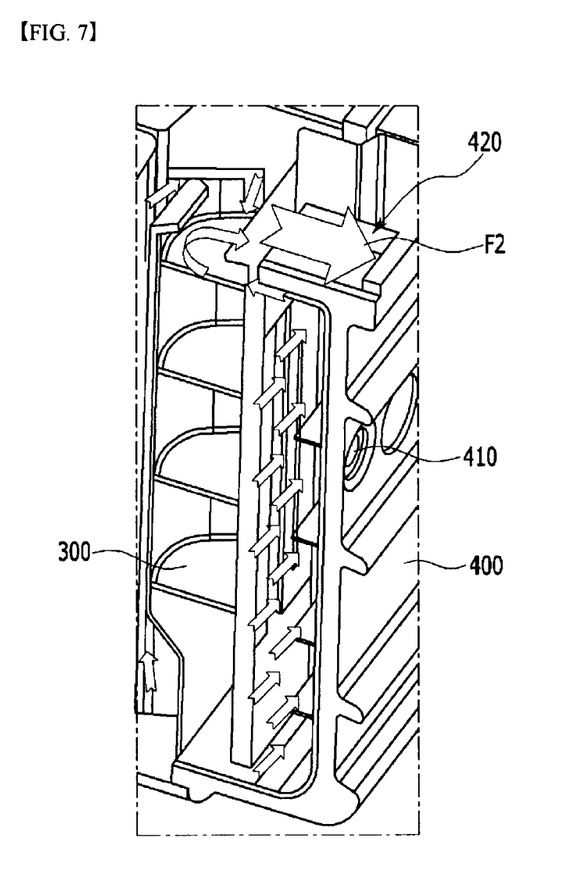
FIG. 7 is a view illustrating portion 7-7 of FIG. 6.

Referring to FIGS. 6 and 7, the connector opening 420, in which the connector 500 is formed, is formed at an upper end of each of the end plates 400, the connector 500 is inserted into and installed in the connector opening 420, and the plurality of battery cells 110 pass through the plurality of slots 330 and are connected to the outside through a second passage part F2 connected to the connector opening 420.

The connector 500 is inserted into the connector opening 420 to close a portion of the connector opening 420, but a space, through which the gas may be discharged, is formed between the connector opening 420 and the inserted connector 500. The gas generated by the plurality of battery cells 110 passes through the slots 330 to be discharged to the outside through the second passage part F2 connected to the gas discharging space of the connector opening 420.

Hereinafter, a third passage part according to the embodiment of the present disclosure will be described with reference to FIG. 8.

Figure 8:
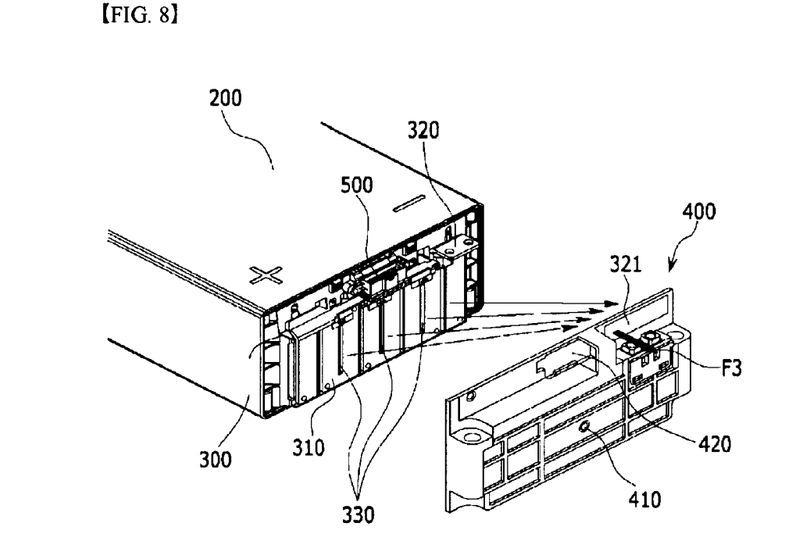
FIG. 8 is a view illustrating a state, in which a third passage part of the battery module is formed, according to the embodiment of the present disclosure.

FIG. 8 is a view illustrating a state, in which a third passage part of the battery module is formed, according to the embodiment of the present disclosure.

Referring to FIG. 8, the busbar frame 300 may include a terminal bus bar 320 formed on one side thereof and protruding in a direction, in which the end plate 400 is formed, the terminal busbar 320 may be formed to pass through a terminal busbar opening 321 formed at one end of the end plate 400, and the plurality of battery cells 110 pass through the plurality of slots 330 and are connected to the outside through a third passage part F3 connected to the terminal busbar opening 321.

The terminal busbar 320 is inserted into the terminal busbar opening 321 to close a portion of the terminal busbar opening 321, but a space, through which the gas may be discharged, is formed between the terminal busbar opening 321 and the inserted terminal busbar 320. The gas generated by the plurality of battery cells 110 passes through the slots 330 to be discharged to the outside through the third passage part F3 connected to the gas discharging space of the terminal busbar opening 321.

Hereinafter, a venting portion according to another embodiment of the present disclosure will be described with reference to FIGS. 9 and 10.

Figure 9:
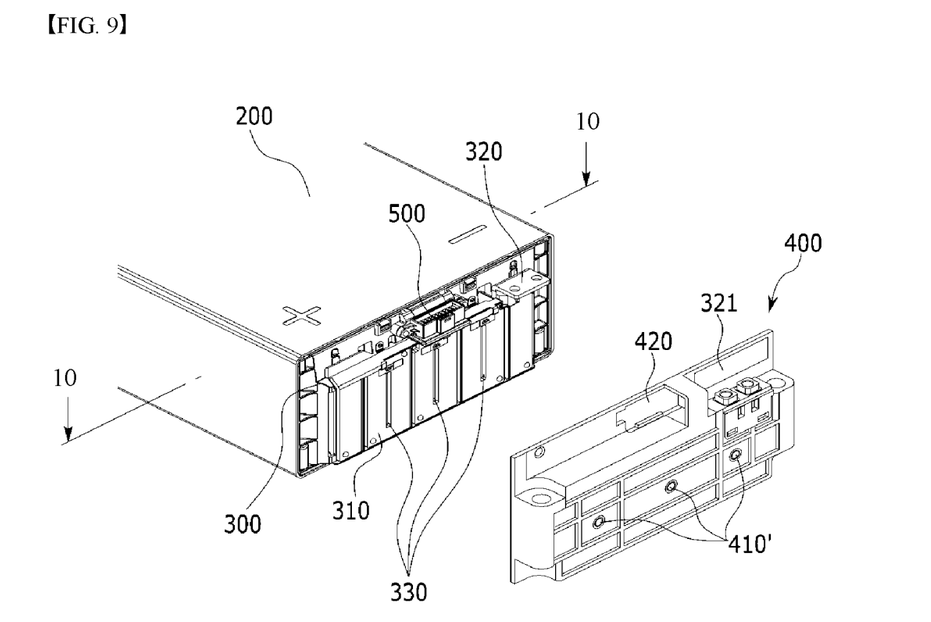
FIG. 9 is a view illustrating a state, in which a venting portion is formed, according to another embodiment of the present disclosure.

FIG. 9 is a view illustrating a state, in which a venting portion is formed, according to another embodiment of the present disclosure. FIG. 10 is a view illustrating portion 10-10 of FIG. 9.

Figure 10:
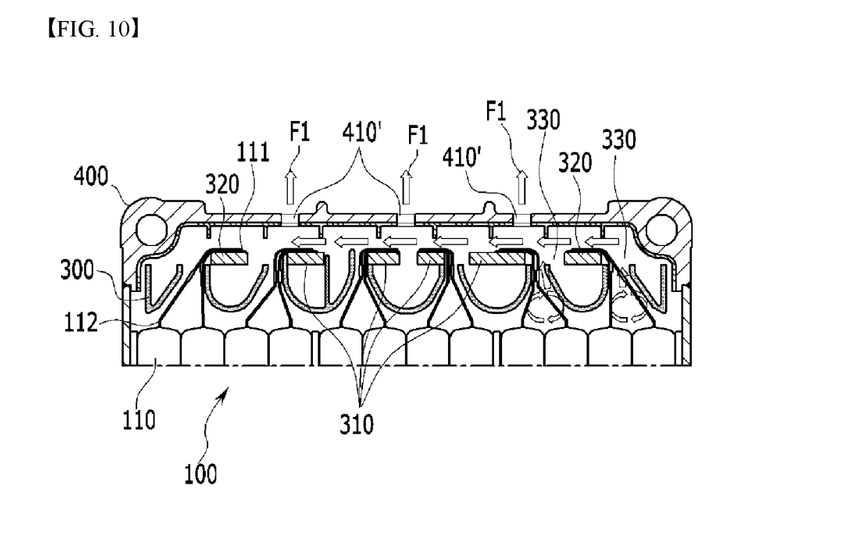
FIG. 10 is a view illustrating portion 10-10 of FIG. 9.

Referring to FIGS. 9 to 10, the venting portion according to another embodiment of the present disclosure may be formed of a plurality of venting holes 410'. As the venting holes 410' are formed of the plurality of venting holes, the gas generated in the interior of the battery module may be more rapidly discharged to the outside. However, the plurality of venting holes 410' according to the embodiment of the present disclosure have to be formed so as to secure durability and airtightness of the battery module.

Hereinafter, a venting portion according to another embodiment of the present disclosure will be described with reference to FIGS. 11 and 12.

Figure 11:
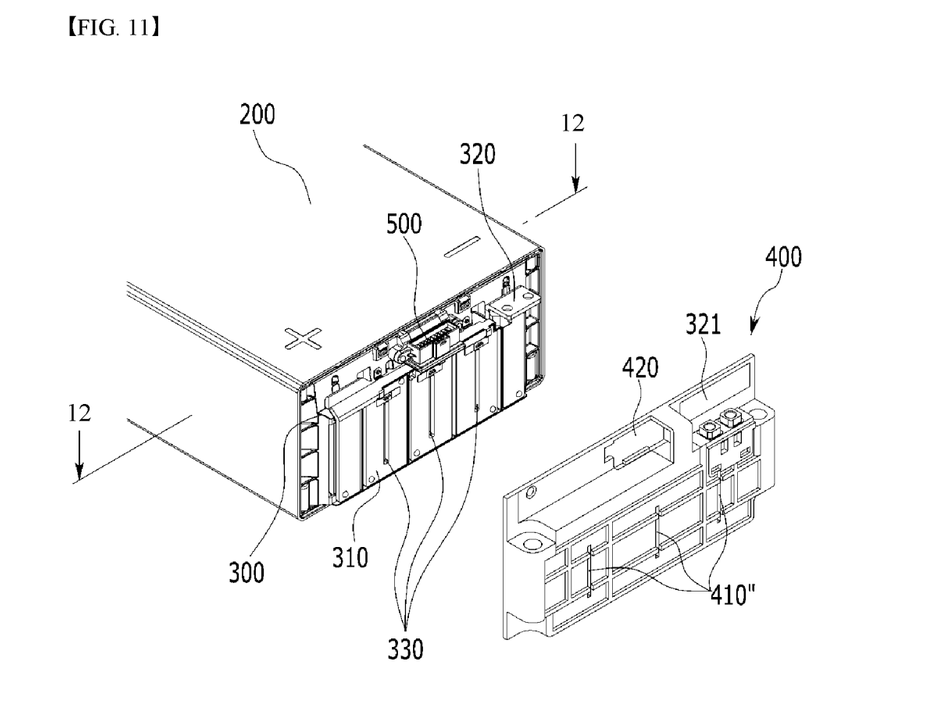
FIG. 11 is a view illustrating a state, in which a venting portion is formed, according to another embodiment of the present disclosure.

FIG. 11 is a view illustrating a state, in which a venting portion is formed, according to another embodiment of the present disclosure. FIG. 12 is a view illustrating portion 12-12 of FIG. 11.

Figure 12:
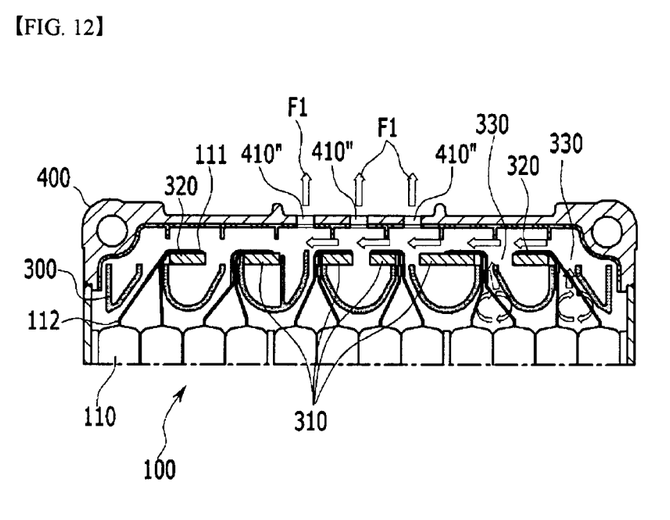
FIG. 12 is a view illustrating portion 12-12 of FIG. 11.

Referring to FIGS. 11 and 12, the venting portion according to another embodiment of the present disclosure may have one or more venting slots 410" each having a slot shape. Further, the venting slots 410" may be formed at the portions corresponding to the plurality of slots 330 formed in the busbar frame 300. Accordingly, because the gas rapidly flows to the venting slots 410" corresponding to the locations and the shape of the plurality of slots 330 to be discharged to the outside through the venting slots 410" after the gas generated by the plurality of battery cells 110 passes through the plurality of slots 330, the gas in the interior of the battery module is rapidly discharged to rapidly secure the safety of the battery module. However, the one or more venting slots 410" according to the embodiment of the present disclosure have to be formed so as to secure durability and airtightness.

The battery module as described above may be included in a battery pack. The battery pack may have a structure in which one or more of the battery modules according to the present embodiment are gathered, and packed together with a battery management system (BMS) and a cooling device that control and manage battery's temperature, voltage, etc.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery cell stack
110: battery cell
111: electrode lead
112: sealing part
200: frame
300: busbar frame
310: busbar
320: terminal busbar
321: terminal busbar opening
330: slot
400: end plate
410: venting portion (venting hole)
410': plurality of venting holes
410": venting slot
420: connector opening
500: connector
F1: first passage part
F2: second passage part
F3: third passage part

The invention claimed is:

1. A battery module comprising:
a battery cell stack, in which a plurality of battery cells are stacked;
a frame accommodating the battery cell stack;
end plates covering a front surface and a rear surface of the battery cell stack; and
busbar frames formed between the end plates and the battery cell stack,
wherein a plurality of slots are formed in each of the busbar frames,
wherein a venting portion is formed at the center of each of the end plates, and
wherein the plurality of battery cells pass through the plurality of slots and are connected to an outside of the battery module through a first passage connected to the venting portion.

2. The battery module of claim 1, wherein the end plates are coupled to the frame through welding, and the end plates and the frame are sealed.

3. The battery module of claim 1, wherein an end of each of the plurality of battery cells is sealed to form a sealing part.

4. The battery module of claim 1, wherein each of the plurality of battery cells comprises an electrode lead protruding from each end of the battery cells, and
wherein the electrode leads pass through the slots and are joined to busbars formed in the busbar frames.

5. The battery module of claim 1, wherein a connector opening is formed at an upper end of the end plate,
wherein a connector is inserted into and installed in the connector opening, and
wherein the plurality of battery cells pass through the plurality of slots and are connected to the outside of the battery module through a second passage connected to the connector opening.

6. The battery module of claim 1, wherein,
each busbar frame comprises a terminal busbar formed on one side thereof and protruding toward a respective one of the end plates,
the terminal busbar is formed to pass through a terminal busbar opening formed at one end of the end plate, and
the plurality of battery cells pass through the plurality of slots and are connected to the outside of the battery module through a third passage connected to the terminal busbar opening.

7. The battery module of claim 1, wherein the venting portion is at least one venting hole.

8. The battery module of claim 7, wherein the at least one venting hole is a plurality of venting holes.

9. The battery module of claim 1, wherein the venting portion has at least one venting slot.

10. The battery module of claim 9, wherein the at least one venting slot is a plurality of venting slots formed at portions corresponding to the plurality of slots formed in the busbar frame.

11. A battery pack comprising the battery module of claim 1.

12. The battery module of claim 1, further comprising a connector extending from each of the end plates;
- a connector opening is formed at an upper end of the end plate; and
- a second passage extending between the first passage and the connector opening.

13. The battery module of claim 1, further comprising:
- a terminal busbar extending from each of the end plates;
- a terminal busbar opening formed in each of the end plates for allowing the passage of the terminal busbar; and
- a third passage extending between the first passage and the terminal busbar opening.

* * * * *